United States Patent [19]

Huot et al.

[11] Patent Number: 5,546,196
[45] Date of Patent: Aug. 13, 1996

[54] SUPPLEMENTAL PHOTOFINISHING DATA SYSTEM

[75] Inventors: Robert D. Huot, Pittsford; John J. Acello, E. Rochester, both of N.Y.

[73] Assignee: Eastman Kodak Company, Rochester, N.Y.

[21] Appl. No.: 394,531

[22] Filed: Feb. 17, 1995

[51] Int. Cl.$^6$ ...................................................... H04N 1/27
[52] U.S. Cl. .............................. 358/527; 358/345; 355/40
[58] Field of Search ........................... 358/487, 527, 358/335, 345, 346; 355/36, 38–42; 354/412; H04N 1/27

[56] References Cited

U.S. PATENT DOCUMENTS

| | | |
|---|---|---|
| 4,805,039 | 2/1989 | Otake et al. . |
| 4,903,068 | 2/1990 | Shiota . |
| 4,920,423 | 4/1990 | Shiota . |
| 4,933,773 | 6/1990 | Shiota et al. . |
| 4,935,809 | 6/1990 | Hayashi et al. . |
| 4,965,662 | 10/1990 | Shiota . |
| 4,966,285 | 10/1990 | Otake et al. . |
| 4,991,004 | 2/1991 | Hayashi et al. . |
| 5,034,836 | 7/1991 | De Marti, Jr. et al. . |
| 5,041,933 | 8/1991 | De Marti, Jr. et al. . |
| 5,101,225 | 3/1992 | Wash et al. . |
| 5,184,227 | 2/1993 | Foley . |
| 5,274,522 | 12/1993 | Taillie . |
| 5,285,324 | 2/1994 | Weigand et al. . |

*Primary Examiner*—Kim Yen Vu
*Attorney, Agent, or Firm*—C. J. Fildes & Co., P.C.

[57] ABSTRACT

A system for use in a photofinishing station wherein photographic prints from photographic film frame images are generated. The system enables the station to process a filmstrip including a magnetic strip, and includes a digital scanner for generating scanned film frame image signals, a magnetic reader module for generating read magnetic strip information signals, and a processing device in communication with the digital scanner and magnetic reader module for adapting the image and information signals for use in the photofinishing station. The system also enables existing photofinishers to read magnetics on film, create in-depth prints, and automatically classify negatives by augmenting their existing equipment.

12 Claims, 3 Drawing Sheets

SUPPLEMENTAL PHOTOFINISHING DATA SYSTEM

FIELD OF THE INVENTION

This invention relates to photofinishing and more particularly to a system for use in a photofinishing station that enables the station to process a filmstrip including a magnetic strip.

BACKGROUND OF THE INVENTION

It is known in the art of photofinishing to utilize an exposure determination film frame scanner to generate scanned frame image signals. These signals are used to determine print exposure operating conditions at a print station wherein photographic prints are generated from photographic film frame images. A system utilizing such a scanner is described in U.S. Pat. No. 5,184,227.

Recent developments in photographic systems include the combination of silver halide and magnetics technologies. New films having a magnetic strip containing magnetic information must be processed on compatible equipment. In addition, the popularity of index prints has been rising in the market place, and the creation of index prints must be done on compatible equipment. Furthermore, existing scanners for automatic determination of print density and color in such equipment as older minilabs is inadequate, and businesses find they get a high yield of photographic output when the negatives are manually classified. This manual classification requires trained equipment operators. Until now, a significant capital investment for new equipment was required to allow the processing of the new films with magnetics, the creation of index prints, and automatic determination of print density and color.

SUMMARY OF THE INVENTION

The present invention provides a system for use in an existing minilab or photofinishing station that allows films having a magnetic strip to be processed therein. The basic system includes a digital scanner for generating scanned film frame image signals in combination with a magnetic reader module for generating read magnetic strip information signals. A processing device adapts the image information signals for use in a minilab or photofinishing station not equipped to handle films having a magnetic strip.

Accordingly, peripheral devices including controllers and interfaces can be combined with the basic system to provide an extensive menu of functions and adapt the system to any existing minilab or photofinishing station. Such peripheral devices can provide various outputs of the scanned image and magnetic data including paper tape, floppy disc, or hardwired outputs. The system can also be configured to allow for backprinting of the magnetic information onto prints as well as other labeling functions.

These and other features and advantages of the invention will be more fully understood from the following detailed description of the invention taken together with the accompanying drawings.

DETAILED DESCRIPTION OF THE INVENTION

Figure 1:
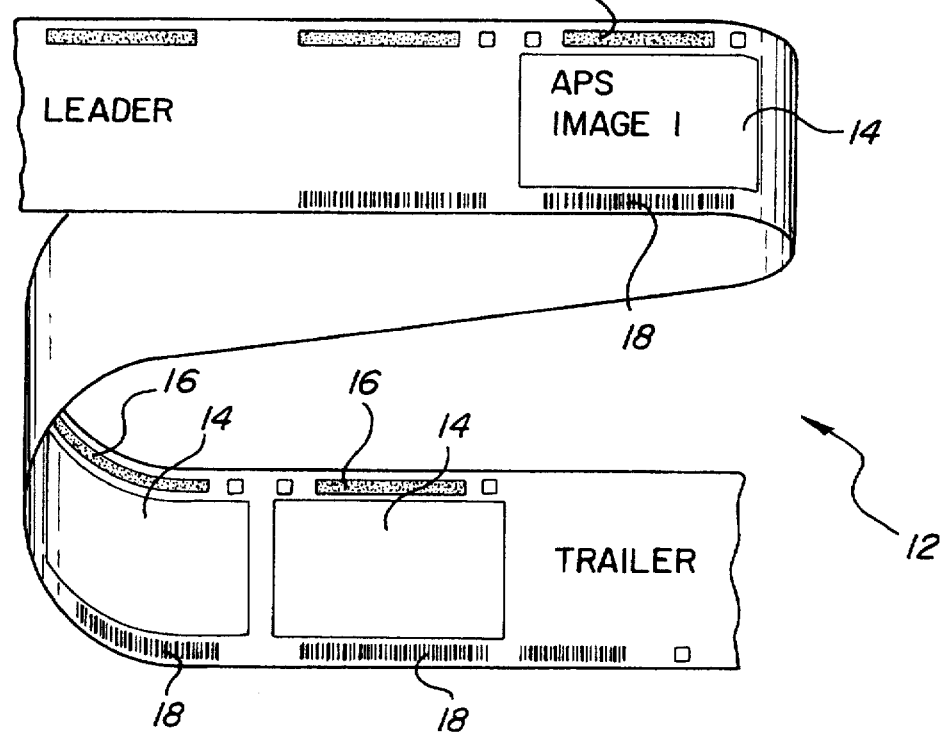
FIG. 1 is a schematic view of a film format including a magnetic strip.

Referring now to the drawings in detail, numeral 10 generally illustrates a stand alone system adaptable for use with a known photofinishing station of the type wherein photographic prints are generated from photographic film frame images. As is hereinafter more fully described, system 10 enables a conventional photofinishing station or minilab to utilize and process film formats containing magnetic information encoded thereon. A film format 12 including a magnetic strip is known and shown in FIG. 1. Film 12 includes a plurality of film frames 14 which include image information, a magnetic strip 16 encoded with magnetic information, and bar code style information 18 placed on the film strip by the camera.

Figure 2:
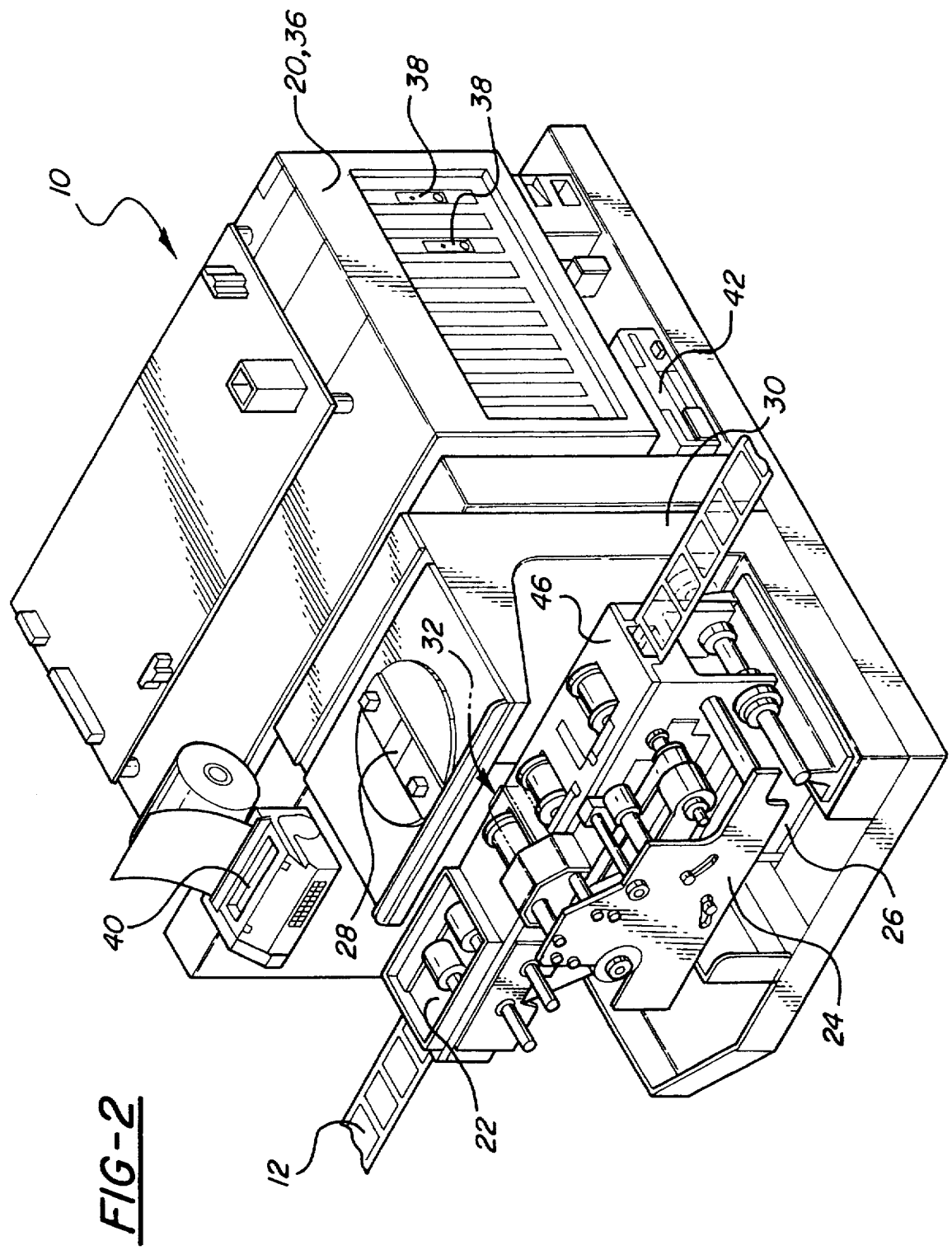
FIG. 2 is a perspective view of an apparatus embodying a system constructed in accordance with the present invention.

In FIG. 2, a representative system 10 is shown. System 10 includes a digital scanner 20 for generating scanned film frame image signals. Such a scanner 20 may be of the optical type as described in U.S. Pat. No. 5,184,227 or may be of the virtual contact type as described in U.S. application Ser. No. 07/618,132. The scanner 20 can detect frame lines and calculate scene balance for a frame as is known. A Kodak Earthquake Scanner is a conventional scanner suitable for use in system 10. Scanner 20 includes a film cleaning section 22, a film track and drive train 24, and an illumination module 26. Scanner 20 also includes a lens/array and support 28 supported by an optics-illumination and track support chassis 30.

Figure 3:
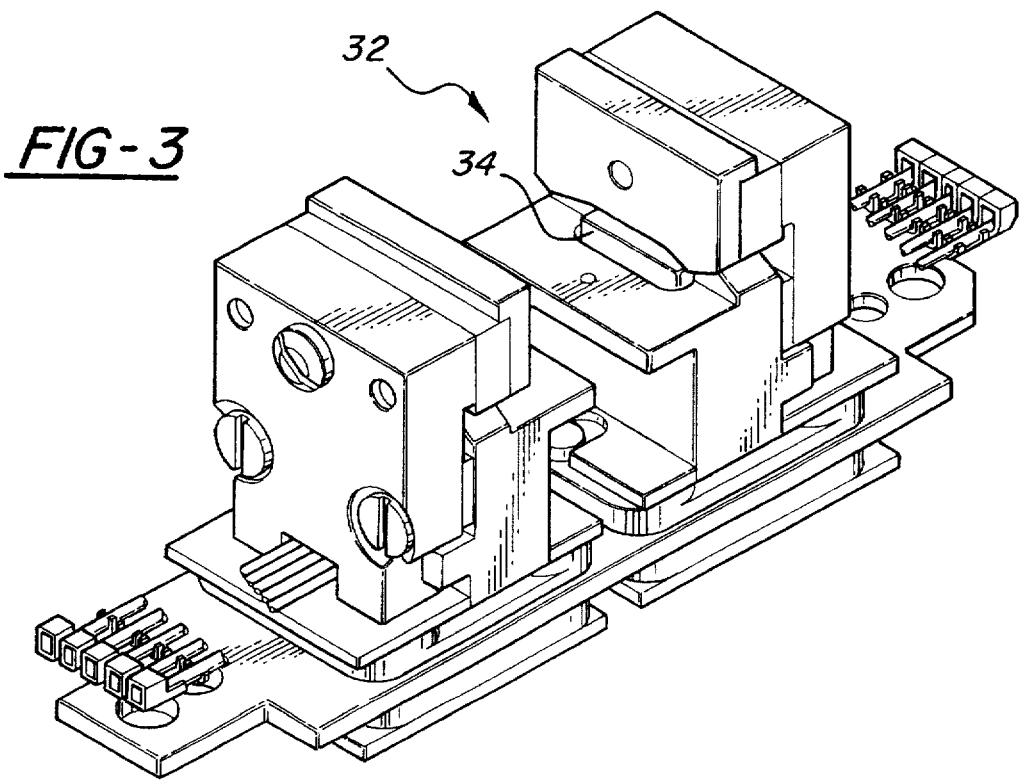
FIG. 3 is an enlarged schematic view of a magnetic reader module of the invention.

With further reference to FIG. 2 and referring to FIG. 3, system 10 also includes a magnetic reader module 32, herein shown as part of scanner 20, for generating read magnetic strip information signals from films having a magnetic strip 16. The magnetic reader module 32 includes a magnetic head assembly 34 which contacts the film and reads the magnetic information encoded by a camera or otherwise on the film magnetic strip 16. Conventional head assemblies are known and disclosed in U.S. Pat. Nos. 5,034,836; 5,041,933; 5,274,522; and 5,285,324.

A processing device 36 in communication with the scanner 20 and magnetic reader module 32 adapts image, and information signals generated from the magnetic strip 16, for use in a photofinishing station for the purpose of determining print density and color correction. The processing device 36 contains the operating system software that controls system 10. Processing device 36 is adaptable for providing a variety of outputs and capable of resizing scanned data to imagette size for creating an index print within a given template. The output information provided by the processor 36 is used as the input for the existing photofinishing system or minilab.

With continuing reference to FIG. 2, the processing device 36 illustrated includes connections 38 of the known parallel port and serial port varieties to allow the establishment of communications with peripheral apparatus and information processing equipment as is more fully and hereinafter described. The system 10 is illustrated with a line printer 40 and a floppy disc drive 42 in communication with the processor 36.

Figure 4:
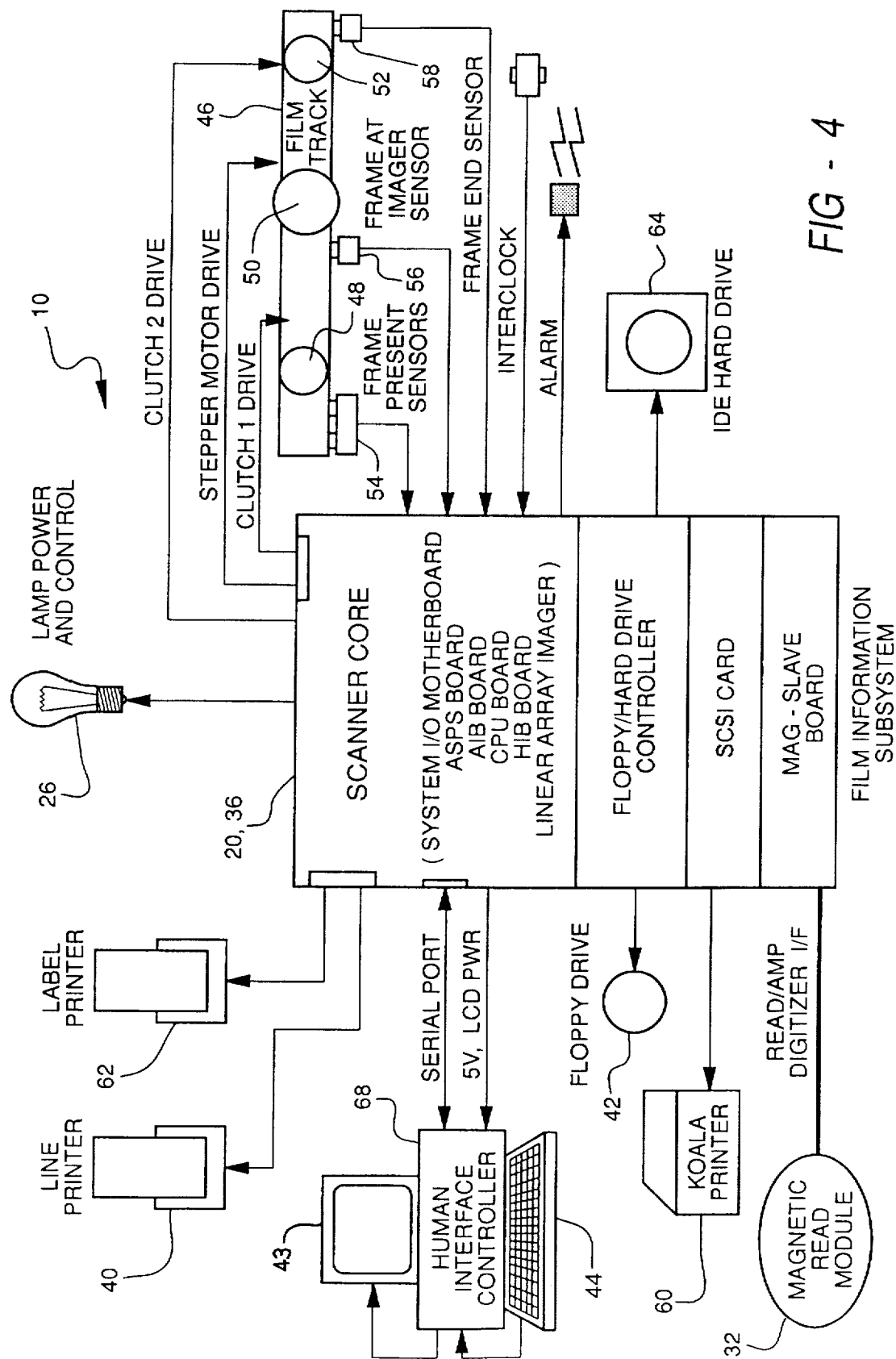
FIG. 4 is a schematic representation of the system constructed in accordance with the present invention as well as peripherals in communication with the system.

The schematic view of FIG. 4 more fully illustrates system 10 and its enhancement with peripheral photofinishing and communications equipment to allow film formats including a magnetic strip 16 to be processed.

In one embodiment of the invention, system 10 will include a control system 68 in communication with the processing device 36. The control system 68 illustrated includes a display 43 and keyboard 44 to provide an operator interface with the system 10. Display 43 is a text display that provides the operator with a simple menu style user interface including prompts, instructions, status, and error messages. The keyboard 44 provides alpha numeric input, punctuation, arrow keys for menu navigation, and an enter key for accepting input. The film track 46, which is part of the scanner 20, is capable of handling conventional 35 mm film as well as film formats having the magnetic strip 16. Separate conveyors, not shown, are required to accommodate the two different film formats. The film track 46 is responsible for guiding and cleaning film strips through the scanner 20. If the related film format does not match the format of film that is actually loaded, the film strip will not be accepted and the user will be notified via an error condition.

Associated with film track 46 are a first clutch drive 48, a stepper motor drive 50, and a second clutch drive 52 each in communication with processing device 36 and operable thereby to move the film. Also associated with film track 46 are a frame present sensor 54, a frame at imager sensor 56, and a frame end sensor 58 each in communication with processing device 36 and part of the scanner 20 for relaying information about the position of a photographic film frame.

The scanner 20 provides the image processing information including exposure and color information to the processing device 36. The magnetic reader module 32 reads the magnetic information off film formats having a magnetic strip 16. With the inputs from the processed film and the operator through the control system, the processing device 36 can be used to provide a variety of output formats including index print data through, for example, a Kodak Koala printer 60, labeled print data through label printer 62, and paper tape output through line printer 40. Information included on the paper tape consists of density and/or color information; high definition, pan print, and normal format information; and other magnetic information. The availability of numerous output formats allows the system 10 to be included in any conventional photofinishing station or minilab.

The processing device 36 shown in FIG. 4 is responsible for image processing, machine control, index print format and frameline detail. Processing device 36 includes a scanner core comprising a card cage and circuit boards. Processing device 36 is illustrated in communication with floppy drive 42, disc drive interface 64, and magnetic reader module 32.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

| Parts List | |
|---|---|
| 10. system | 40. line printer |
| 12. film format | 42. floppy disc drive |
| 14. film frames | 43. display |
| 16. magnetic strip | 44. keyboard |
| 18. optical information (i.e. bar code) | 46. film track |
| | 48. first clutch drive |
| 20. digital scanner | 50. stepper motor drive |
| 22. film cleaning section | 52. second clutch drive |
| 24. drive train | 54. frame present sensor |
| 26. illumination module | 56. frame and imager sensor |
| 28. lens/array and support | |
| 30. track support chassis | 58. frame end sensor |
| 32. magnetic reader module | 60. Koala printer |
| 34. magnetic head assembly | 62. label printer |
| 36. processing device | 64. disc drive |
| 38. connections | 68. control system |

What is claimed is:

1. A supplemental photofinishing data system for use with a photofinishing station wherein photographic prints from photographic film frame images are generated, said system enabling said station to process a filmstrip including a magnetic strip and characterized by:

a stand along integral unit for supplemental data collection and distribution to a photofinishing station, said unit having:

a digital scanner for generating scanned film frame image signals;

a magnetic reader module for generating read magnetic strip information signals;

a processing device in communication with said digital scanner and magnetic reader module for adapting said image and information signals for use in said photofinishing station; and an output for communication said image and information signals to said photofinishing station.

2. The system of claim 1 characterized in that said processing device is capable of resizing scanned data to imagette size for creating an index print within a given template.

3. The system of claim 1 characterized in that said digital scanner is an optical type scanner which can detect frame lines and calculate scene balance for a frame.

4. The system of claim 1 characterized in that said digital scanner is a virtual contact type scanner.

5. The system of claim 1 characterized in that said magnetic reader module can read film magnetic information and convert it to digital data fields.

6. The system of claim 1 characterized in that said processing device output is a paper tape.

7. The system of claim 1 characterized in that said processing device output is a floppy disc interface.

8. The system of claim 1 characterized in that said processing device output is hardwired to said photofinishing station.

9. The system of claim 1 characterized by:

a control system in communication with said processing device providing a user interface therewith.

10. The system of claim 9 characterized in that said control system includes a display.

11. The system of claim 9 characterized in that said control system includes a keyboard.

12. The system of claim 1 characterized by a printer in communication with said processing device enabling backprinting of said photographic prints with read magnetic strip information.

\* \* \* \* \*